United States Patent
Kondo (10) Patent No.: US 10,538,274 B2
(45) Date of Patent: Jan. 21, 2020

(54) VEHICLE BODY FRONT STRUCTURE

(71) Applicant: HONDA MOTOR CO., LTD., Tokyo (JP)

(72) Inventor: Takehiro Kondo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/027,549

(22) Filed: Jul. 5, 2018

(65) Prior Publication Data

US 2019/0009830 A1 Jan. 10, 2019

(30) Foreign Application Priority Data

Jul. 5, 2017 (JP) ................. 2017-131705

(51) Int. Cl.
*B62D 25/08* (2006.01)
*B60G 13/00* (2006.01)

(52) U.S. Cl.
CPC ......... *B62D 25/088* (2013.01); *B60G 13/003* (2013.01); *B60G 2204/128* (2013.01); *B60G 2206/11* (2013.01); *B62D 25/082* (2013.01)

(58) Field of Classification Search
CPC .. B62D 25/088; B62D 25/082; B60G 13/003; B60G 2206/11; B60G 2204/128
USPC .................................................... 293/203.02
See application file for complete search history.

(56) References Cited

U.S. PATENT DOCUMENTS 9,233,719 B2 * 1/2016 Shibata ............... B62D 25/082

FOREIGN PATENT DOCUMENTS

| DE | 10 2013 014 704 | 3/2015 |
|---|---|---|
| EP | 2433850 A1 | 3/2012 |
| JP | S61-25222 | 2/1986 |
| JP | 2007-245864 | 9/2007 |
| JP | 5087119 B2 | 11/2012 |
| JP | 2014-213711 | 11/2014 |
| JP | 2015-077819 | 4/2015 |
| JP | 2016-052876 A | 4/2016 |
| JP | 2016-106055 | 6/2016 |
| JP | 2017-074886 A | 4/2017 |
| JP | 2018-108798 | 7/2018 |

OTHER PUBLICATIONS

Japanese Office Action with English translation dated Mar. 19, 2019, 7 pages.

* cited by examiner

*Primary Examiner* — Pinel E Romain
(74) *Attorney, Agent, or Firm* — Rankin, Hill & Clark LLP (57) ABSTRACT

A vehicle body front structure including a torque rod attachment mechanism to attach a torque rod supporting a driving source of a vehicle to a damper housing includes: a front attachment section that attaches the torque rod attachment mechanism to the vehicle front side of the damper housing; a rear attachment section that is located rearward of the front attachment section and attaches the torque rod attachment mechanism to the damper housing. The damper housing includes a pair of lateral beads between the front attachment section and the rear attachment section. The pair of lateral beads extends in the vehicle longitudinal direction.

3 Claims, 8 Drawing Sheets

VEHICLE BODY FRONT STRUCTURE

BACKGROUND OF THE INVENTION

1. Field of the Invention

The present invention relates to a vehicle body front structure of a vehicle, such as an automobile, for example.

2. Description of the Related Art

Japanese Patent Publication No. 5087119 (Patent Literature 1) discloses a vehicle body front structure which includes a torque rod bracket connected to an end of a torque rod extending from the engine side and is provided in a damper housing.

In the vehicle body front structure disclosed in Patent Literature 1, a vertical bead extending in a vertical direction is further provided for the damper housing.

When the torque rod bracket is provided for the damper housing, the damper housing is subjected to load in the longitudinal direction of the vehicle, transmitted from the engine side through the torque rod bracket.

The damper housing therefore needs measures to bear excessive load in the longitudinal direction of the vehicle, transmitted from the engine side.

SUMMARY OF THE INVENTION

The present invention has been made to solve the above problems and makes it an object thereof to provide a vehicle body front structure capable of providing desired rigidity and strength for load in the vehicle longitudinal direction applied to the damper housing.

To achieve the aforementioned object, an aspect of the present invention is a vehicle body front structure including a bracket mechanism to attach a mounting member supporting a driving source of a vehicle to a damper housing, the structure including: a front attachment section that attaches the bracket mechanism to the vehicle front side of the damper housing; a rear attachment section that is located rearward of the front attachment section and attaches the bracket mechanism to the damper housing. The damper housing includes a bead between the front attachment section and the rear attachment section, the bead extending in the vehicle longitudinal direction.

According to the present invention, it is possible to provide a vehicle body front structure capable of providing desired rigidity and strength for load in the vehicle longitudinal direction applied to the damper housing.

DETAILED DESCRIPTION OF THE EMBODIMENTS

An embodiment of the present invention will be hereinafter described in detail with reference to the accompanying drawings. In each drawing, arrows FRONT and REAR indicate the longitudinal direction of a vehicle (referred to as a vehicle longitudinal direction); arrows RIGHT and LEFT indicate the lateral direction of the vehicle (referred to as a vehicle lateral direction); and arrows TOP and BOTTOM indicate the vertical direction.

Figure 1:
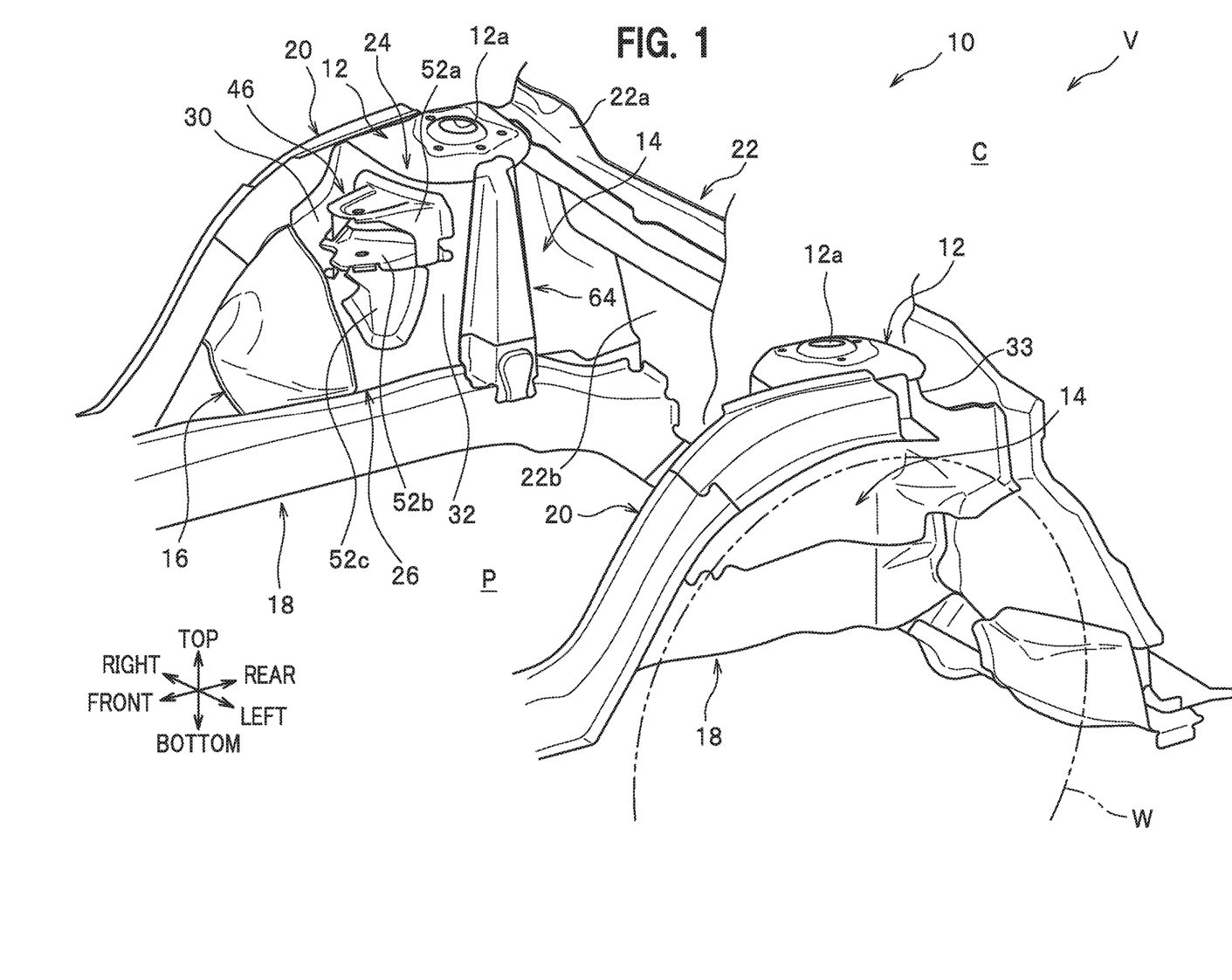
FIG. 1 is a partial perspective view of a vehicle to which a vehicle body front structure according to an embodiment of the present invention is applied.

As illustrated in FIG. 1, a vehicle V includes a power plant compartment P and an occupant compartment C. The power plant compartment P accommodates a not-illustrated power unit such as an engine or a motor, for example. The occupant compartment C is a space for occupants. A vehicle body front structure 10 according to the embodiment is characterized in the structure around later-described damper housings 14 which are arranged to the right and left of the power plant compartment P. In FIG. 1, W indicates a front left wheel.

As illustrated in FIG. 1, the vehicle body front structure 10 includes a pair of right and left damper bases 12, 12, a pair of right and left damper housings 14, 14, and a pair of right and left damper housing extensions 16, 16.

Each of the pair of right and left damper bases 12, 12, the pair of right and left damper housings 14, 14, and the pair of right and left damper housing extensions 16, 16 is symmetric bilaterally. The following description is given for the damper base 12, damper housing 14, and damper housing extension 16 provided on the right side of the vehicle V. The description of the left side is omitted.

The vehicle body front structure 10 includes a pair of right and left front side frames 18, 18 and a pair of right and left lower members 20, 20. The front side frames 18, 18 are provided to the right and left of the power plant compartment P. The lower members 20, 20 are provided to the outside of the respective front side frames 18, 18 in the vehicle lateral direction.

The vehicle body front structure 10 includes a dashboard 22, which separates the power plant compartment P and the occupant compartment C. The dashboard 22 is provided rearward of the pair of right and left front side frames 18, 18 in the vehicle longitudinal direction. The dashboard 22 includes a dashboard upper 22a constituting upper part of the dashboard 22 and a dashboard lower 22b constituting lower part.

Figure 6:
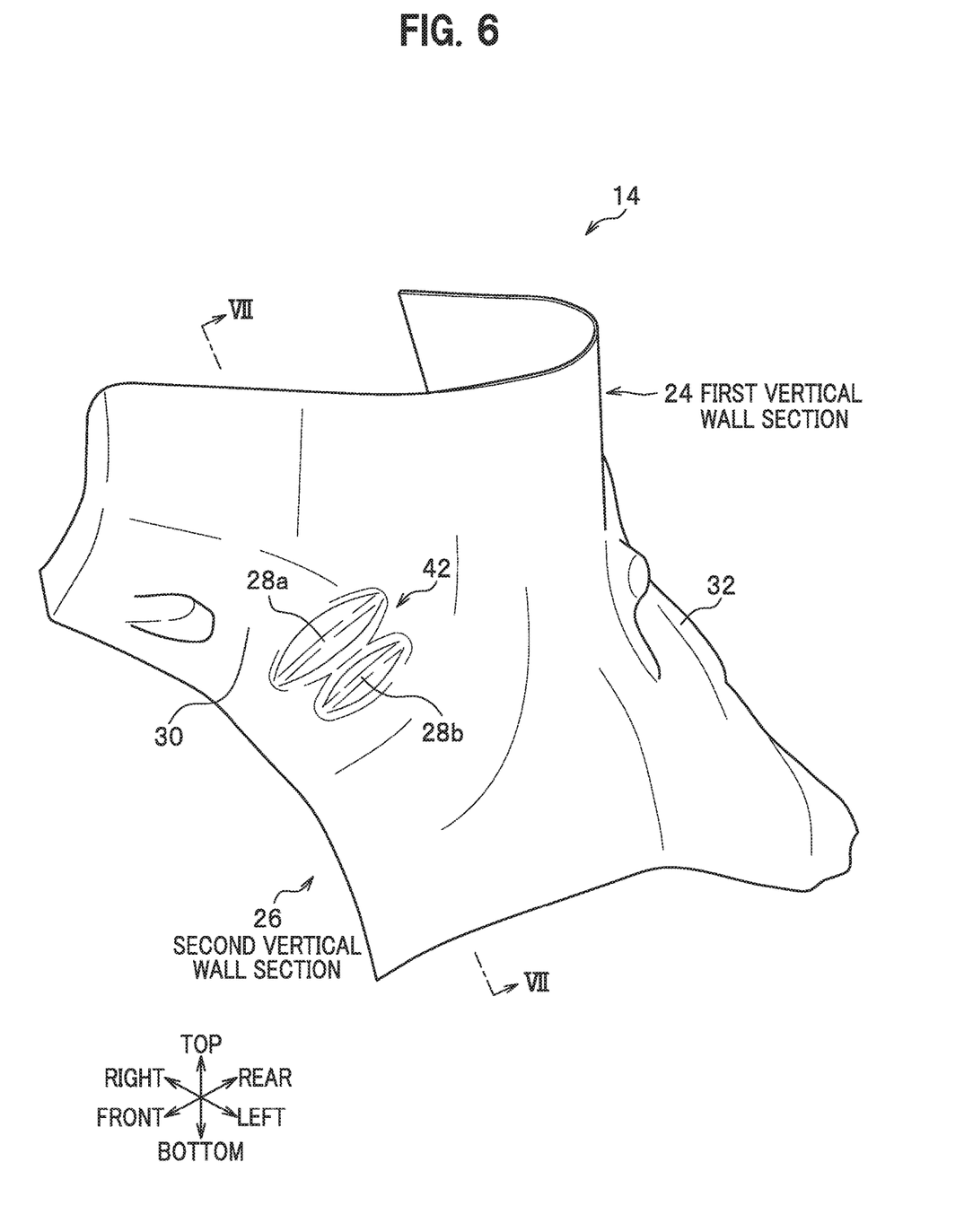
FIG. 6 is a perspective view of the damper housing.
Figure 7:
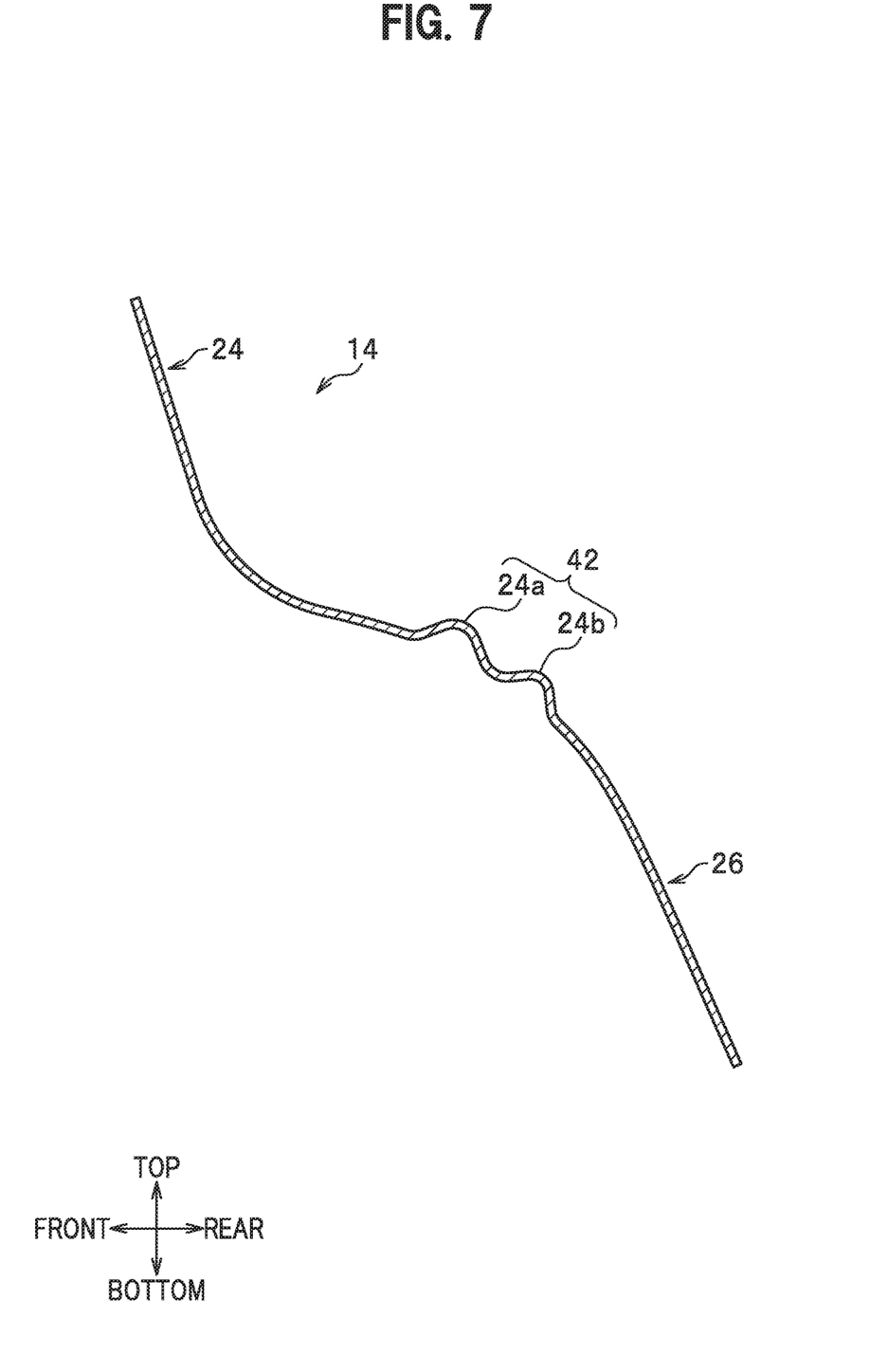
FIG. 7 is an end view along a line VII-VII of FIG. 6.

As illustrated in FIGS. 6 and 7, the damper housing 14 includes a first vertical wall section 24 and a second vertical wall section 26. The first vertical wall section 24 is located in upper part of the entire damper housing 14 and extends in the vertical direction to cover a not-illustrated damper. The first vertical wall section 24 provides a substantially semi-circular shape in a cross-sectional view in the horizontal direction and is formed upright. The second vertical wall section 26 is located on the vehicle front side of the entire damper housing 14 and extends in the vertical direction so as to cover the wheel W (see FIG. 1). The second vertical wall section 26 is substantially quadrant-shaped in a vertically-sectional view. Between the first and second vertical wall sections 24 and 26 in the vertical direction, a later-described pair of lateral beads 28a, 28b (a bead) is provided.

Figure 2:
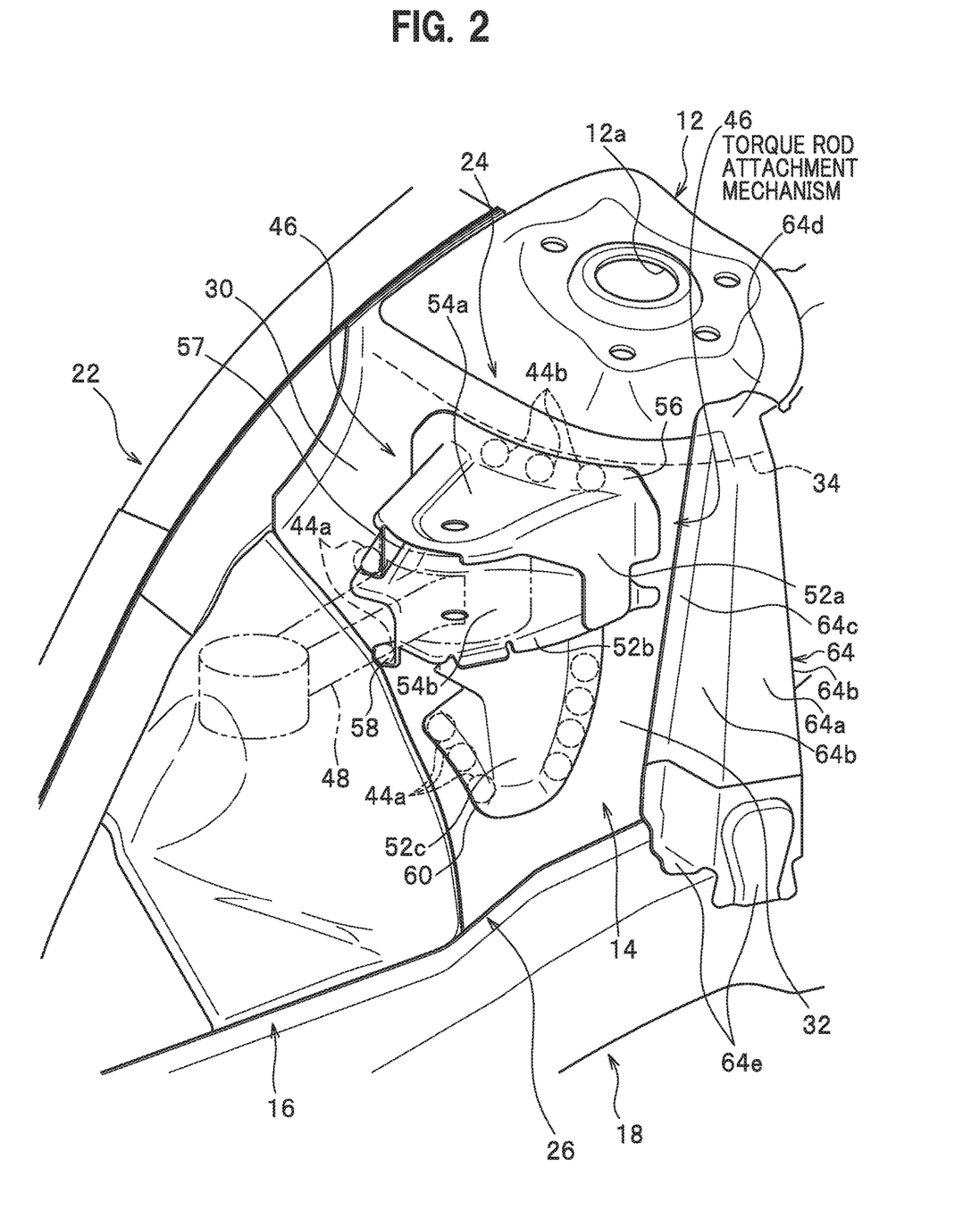
FIG. 2 is an enlarged perspective view of right part of the vehicle illustrated in FIG. 1.

As illustrated in FIG. 2, the damper housing 14 includes a front wall 30, a sidewall 32, and a rear wall 33 (see FIG. 1). The front wall 30 includes a front surface which is located forward of the damper base 12 and faces forward in the vehicle longitudinal direction. The sidewall 32 includes a side surface which is located to the inward side of the damper base 12 and faces inward in the vehicle lateral direction. The rear wall 33 includes a rear surface which is located rearward of the damper base 12 and faces rearward in the vehicle longitudinal direction. The damper base 12 is fixed (welded) to upper part of the damper housing 14. The damper base 12 includes a joint flange 34 which is a part bent downward at the circumferential edge of the base body (see FIGS. 2, 3, 4, and 8). At the center of the damper base 12, an opening 12a is formed. In the opening 12a, a protrusion provided for a not-illustrated damper head is inserted.

Figure 3:
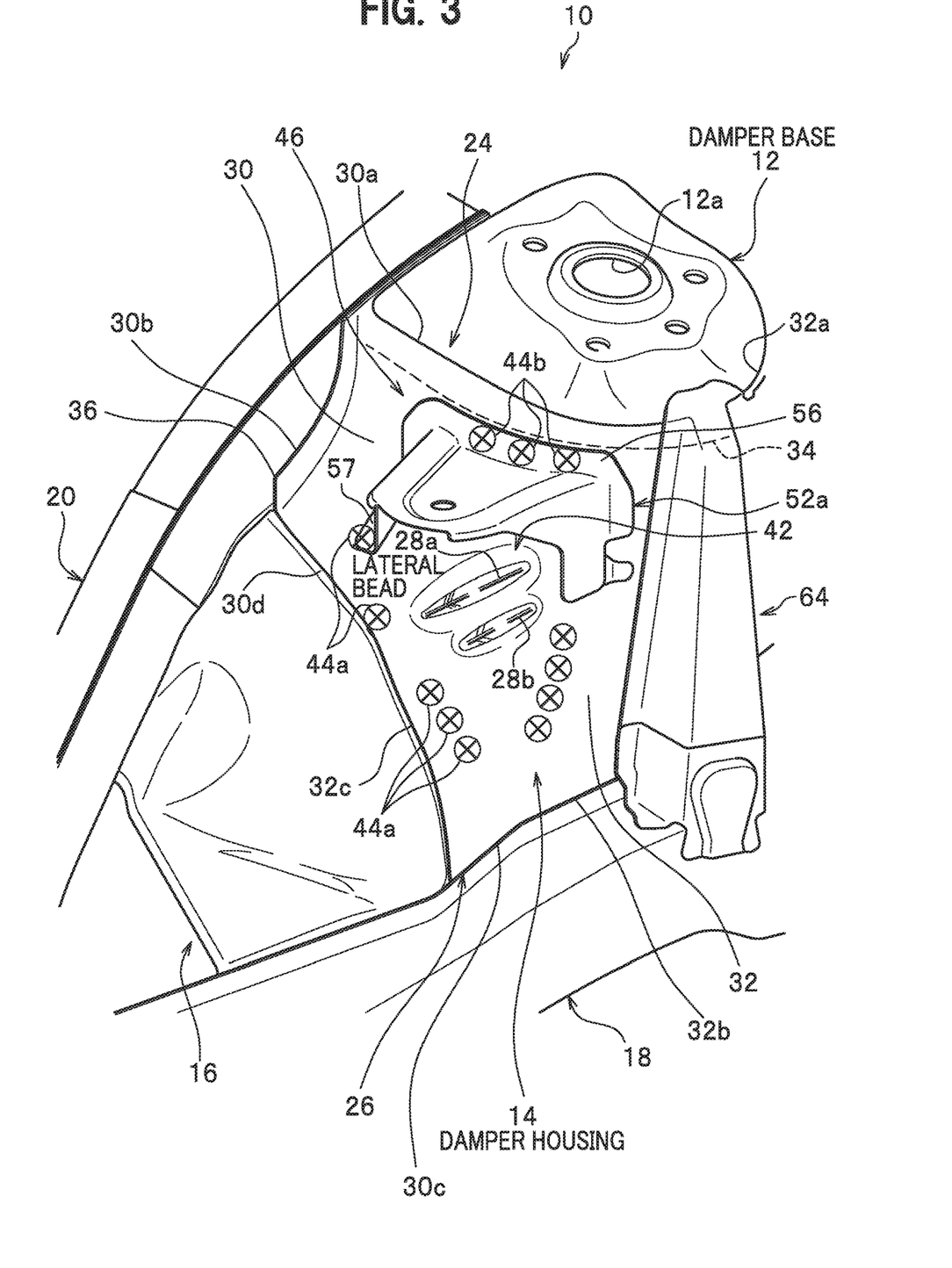
FIG. 3 is an enlarged perspective view illustrating the right part of the vehicle illustrated in FIG. 2, with a lower bracket and a supporting bracket removed.

As illustrated in FIG. 3, in the damper housing 14, an upper end 30a of the front wall 30 and an upper end 32a of the sidewall 32 are connected to the joint flange 34 of the damper base 12. An outer end 30b of the front wall 30, on the outer side in the vehicle lateral direction, is provided with another joint flange 36 bent upward. The another joint flange 36 is connected to the inner side surface of a curved section of the lower member 20, and a lower end 30c of the front wall 30 and a lower end 32b of the sidewall 32 are connected to the outer surface of the front side frame 18.

The front wall 30 of the damper housing 14 is curved in such a manner that the front surface thereof facing forward in the vehicle longitudinal direction is convex downward.

Figure 5:
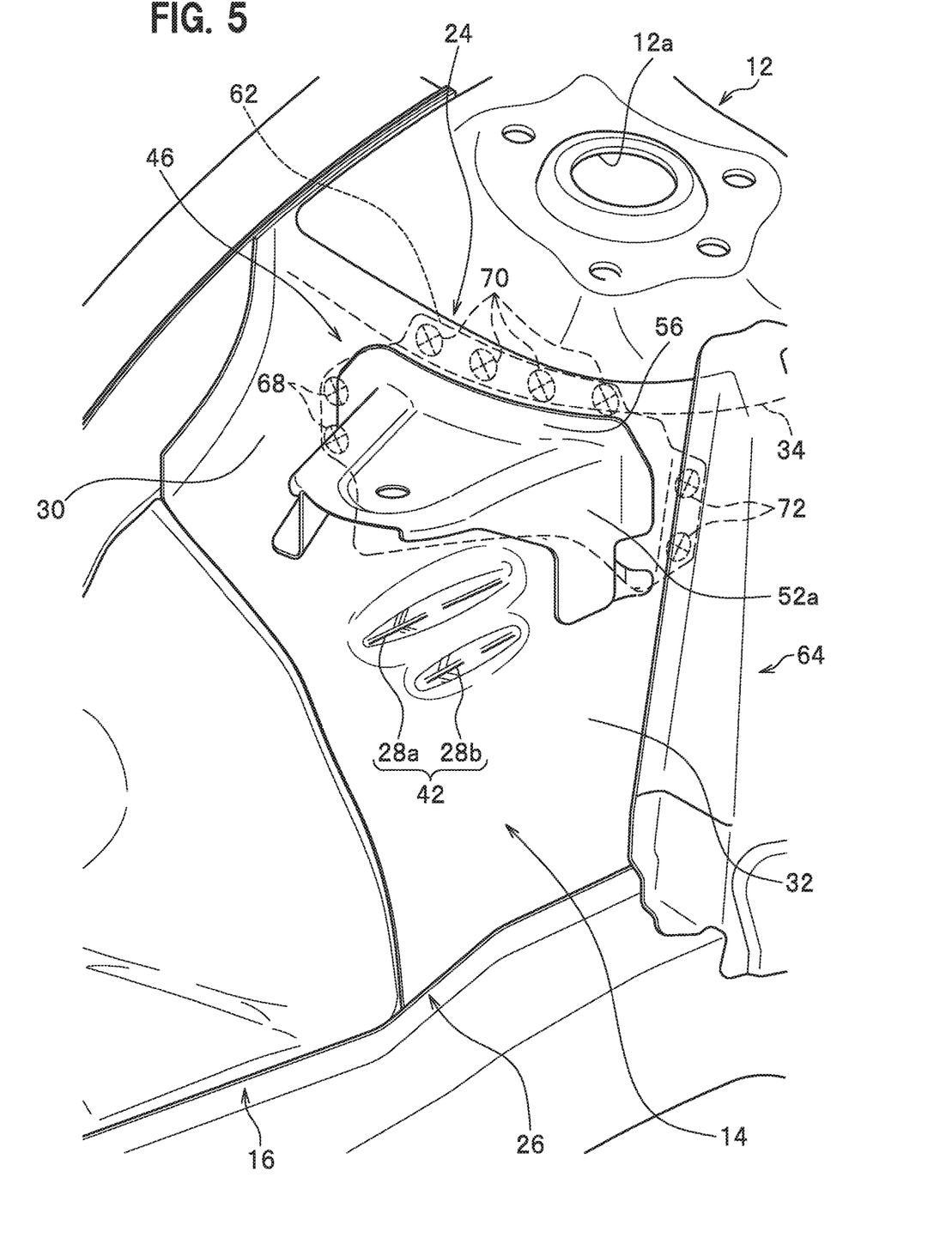
FIG. 5 is a perspective view illustrating a relationship between the torque rod attachment mechanism provided on the inner surface (front surface) of the damper housing and a reinforcement panel bonded to the outer surface (back surface) of the damper housing.

As illustrated in FIGS. 3, 5, and 6, the front wall 30 of the damper housing 14 includes a bead section 42. The bead section 42 includes the pair of lateral beads 28a, 28b (bead). As illustrated in FIG. 3, the pair of lateral beads 28a, 28b is located between later-described front attachment sections 44a, which are located on the vehicle front side, and rear attachment sections 44b, which are located rearward of the front attachment sections 44a in the vehicle longitudinal direction. The pair of lateral beads 28a, 28b extend substantially parallel to each other in the vehicle longitudinal direction. In the pair of lateral beads 28a, 28b, the upper lateral bead 28a is longer than the lower lateral bead 28b.

The bead section 42 is composed of protrusions that protrude from the outside in the vehicle lateral direction toward the power plant compartment P (see FIG. 7). However, the bead section 42 is not limited to this configuration. The bead section 42 may be composed of depressed portions that are depressed from the power plant compartment P toward the outside in the vehicle lateral direction, for example.

Figure 4:
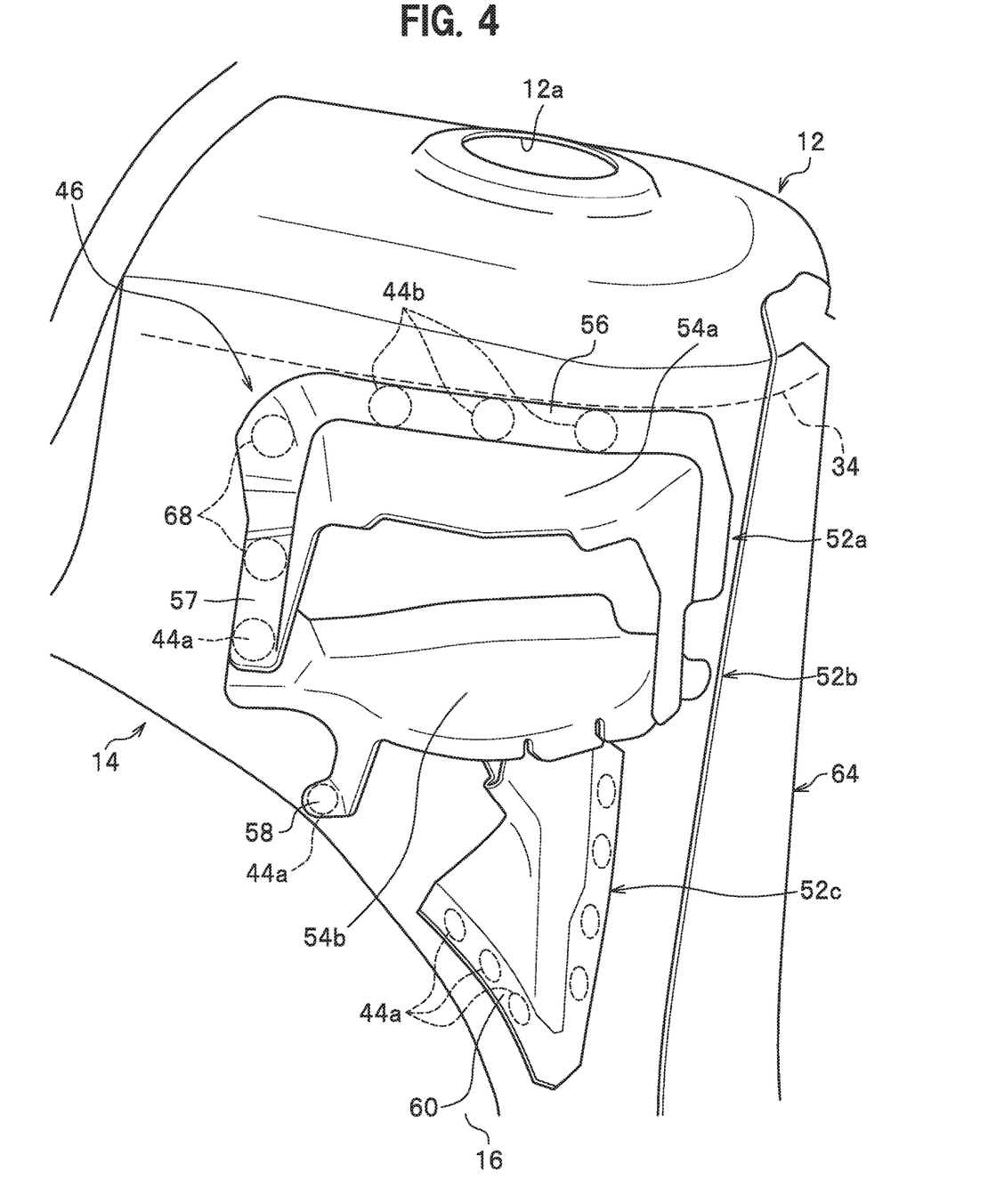
FIG. 4 is an enlarged perspective view illustrating an upper bracket, the lower bracket, and the supporting bracket, which constitute a torque rod attachment mechanism.

As illustrated in FIGS. 2 and 4, a damper housing 14 includes a torque rod attachment mechanism (bracket mechanism) 46. The torque rod attachment mechanism 46 attaches a torque rod (mounting member) 48 (see FIG. 2) to the damper housing 14. The torque rod 48 supports a driving source of the vehicle, such as an engine or a motor, for example.

As illustrated in FIGS. 1, 2, and 4, the torque rod attachment mechanism 46 is composed of an upper bracket 52a, a lower bracket 52b, and a supporting bracket 52c. The upper bracket 52a, lower bracket 52b, and supporting bracket 52c constitute the bracket mechanism.

As illustrated in FIG. 2, The upper and lower brackets 52a and 52b respectively include paired holding sections 54a and 54b, which sandwich the proximal end of the torque rod 48 with not-illustrated bolts and nuts. The pair of holding sections 54a and 54b protrude parallel to each other toward the front of the vehicle and face each other in the vertical direction. The paired holding sections 54a and 54b of the upper and lower brackets 52a and 52b are supported by the supporting bracket 52c, which is provided under the lower bracket 52b.

Comparing FIGS. 2 and 3, an upper flange section 56 of the upper bracket 52a is bonded to the rear attachment sections 44b, which are provided in the damper housing 14. A side flange section 57 of the upper bracket 52a, a leg flange section 58 of the lower bracket 52b, and a front flange section 60 of the supporting bracket 52c are bonded to the front attachment sections 44a, which are provided on the vehicle front side of the damper housing 14. The rear attachment sections 44b are located rearward of the front attachment sections 44a in the vehicle longitudinal direction. In FIG. 3, upper two of the front attachment sections 44a are attachments for the upper and lower brackets 52a and 52b, and lower three of the front attachment sections 44a are attachments for the supporting bracket 52c.

In the embodiment, the upper bracket 52a, lower bracket 52b, and supporting bracket 52c are attached to the damper housing 14 using a not-illustrated welding apparatus. However, the attachment method is not limited thereto. The upper, lower, and supporting brackets 52a to 52c may be attached to the damper housing 14 using another method, including fastening with bolts and nuts and adhesive joining, for example.

The damper housing 14 includes a reinforcement panel (a damper housing reinforcement member) 62 (see FIGS. 8 and 5) and a vertical reinforcement member 64 (see FIG. 3). The reinforcement panel 62 reinforces the damper housing 14. The vertical reinforcement member 64 is located rearward of the lateral beads 28a, 28b in the vehicle longitudinal direction and extends in the vertical direction.

Figure 8:
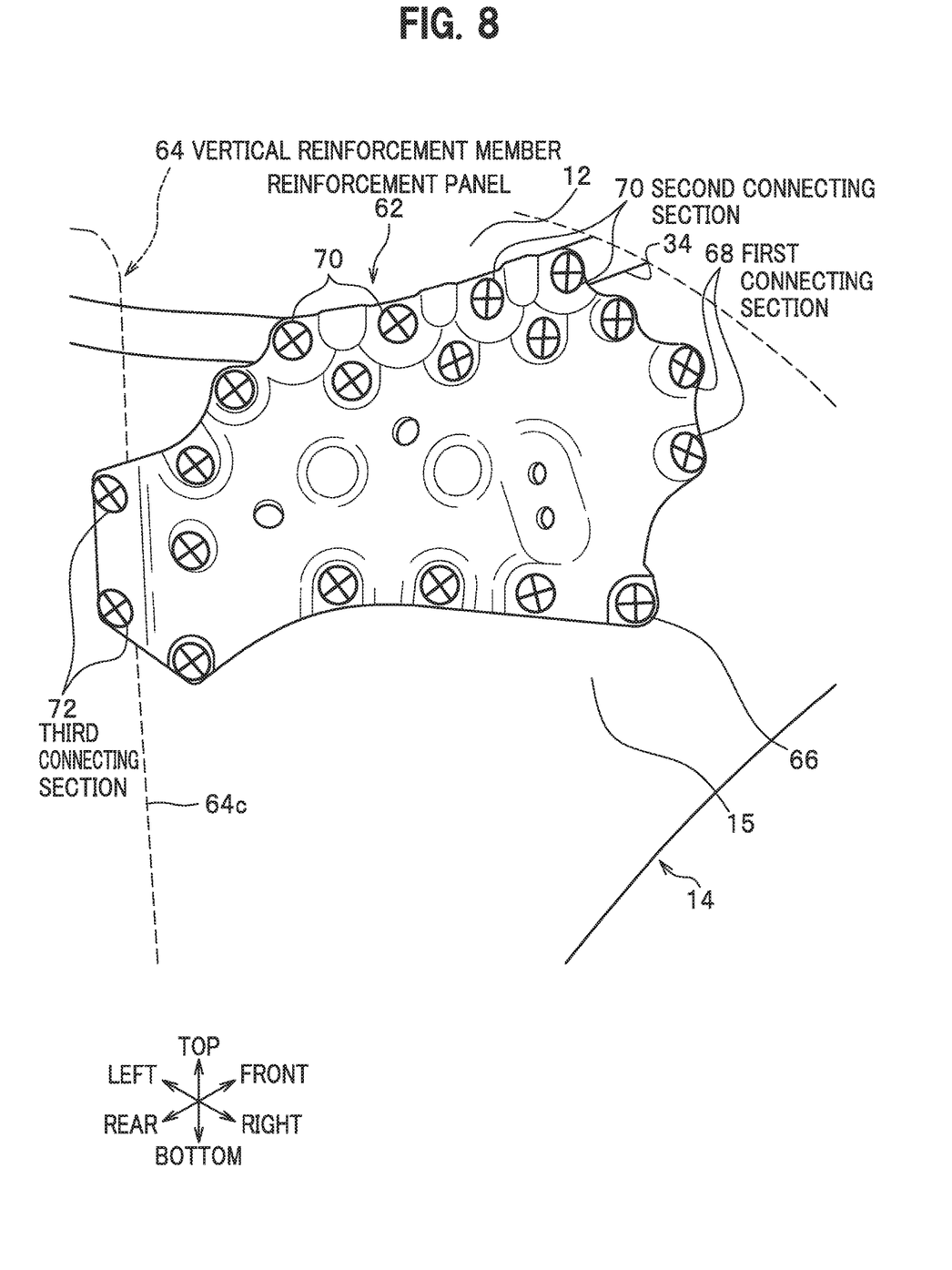
FIG. 8 is an explanatory view illustrating a connecting relationship of the reinforcement panel.

As illustrated in FIGS. 8 and 5, the reinforcement panel 62 is provided on an outer surface 15 (the back surface) of the damper housing 14 and faces the torque rod attachment mechanism 46 across the damper housing 14. The reinforcement panel 62 is composed of a horizontally-long rectangular member and is placed on the inner side of upper part of the front wall 30 and sidewall 32. In the reinforcement panel 62, a plurality of circular depressed sections 66, which are depressed toward the damper housing 14, are formed. The reinforcement panel 62 is welded to the damper housing 14 at the plurality of circular depressed sections 66.

As illustrated in FIG. 8, the reinforcement panel 62 includes a first connecting section 68, a second connecting section 70, and a third connecting section 72, which are bonded (connected) to various elements.

The first connecting section 68 is a region connected to the damper housing 14 and torque rod attachment mechanism 46. The first connecting section 68 is provided on the outer side of the front end of the reinforcement panel 62. The first connecting section 68 is composed of connection of the side flange section 57 of the upper bracket 52a, damper housing 14, and reinforcement panel 62 integrally bonded to each other.

The second connecting section 70 is a region connected to the damper housing 14 and damper base 12. The second connecting section 70 is provided in upper part of the reinforcement panel 62 rearward of the first connecting section 68 in the vehicle longitudinal direction. The second connecting section 70 is composed of connection of the damper housing 14, the joint flange 34 of the damper base 12, and the reinforcement panel 62 integrally bonded to each other.

The third connecting section 72 is a region which extends from the first and second connecting sections 68 and 70 and is connected to the damper housing 14 and vertical reinforcement member 64. The third connecting section 72 is provided on the outer side of the rear end of the reinforcement panel 62. The third connecting section 72 is composed of connection of a joint flange 64c of the later-described vertical reinforcement member 64, the damper housing 14, and the reinforcement panel 62 integrally bonded to each other.

The vertical reinforcement member 64 includes a hat-shaped cross-section along a plane perpendicular to the axis. The vertical reinforcement member 64 is composed of an upper member and a lower member which are integrally connected. As illustrated in FIG. 2, the vertical reinforcement member 64 includes a top wall 64a, a pair of sidewalls 64b, 64b, and the joint flange 64c. The pair of sidewalls 64b, 64b are continuous to the top wall 64a and are opposite to each other. The joint flange 64c is continuous to each sidewall 64b. The joint flange 64c is bonded to the inner surface of the sidewall 32 of the damper housing 14, that faces the power plant compartment P. As illustrated in FIG. 2, an upper end joint flange 64d is provided in the upper end of the vertical reinforcement member 64, and a lower end joint flange 64e is provided in the lower end. The upper end joint flange 64d is bonded to the damper base 12, and the lower end joint flange 64e is bonded to the front side frame 18.

Back to FIG. 1, a damper housing extension 16 is bonded to the damper housing 14, lower member 20, and front side frame 18 with an adhesive. The joint portions, which are bonded with an adhesive in this embodiment, may be welded by spot welding instead, for example.

The damper housing extension 16 includes a joint flange (not illustrated) the outer surface of which is a little depressed compared with the other surface of the damper housing extension 16. The damper housing extension 16 is connected to the damper housing 14 at the depressed joint flange so that the outer surfaces of the damper housing extension 16 and damper housing 14, that face the power plant compartment P, are substantially continuous to each other.

The front side frame 18 is located below the lower member 20 and is composed of a frame member of a hollow-section structure which extends along the vehicle longitudinal direction. The front end of the front side frame 18 is coupled to a not-illustrated front bulk head. The rear end of the front side frame 18 is coupled to the lower end of the dashboard lower 22b (see FIG. 1).

Each lower member 20 is composed of a frame member of a hollow section structure which extends along the vehicle longitudinal direction. The lower member 20 includes a curved section and gradually lowers toward the front of the vehicle. The front end of the lower member 20 is coupled to a not-illustrated front bulk head. The rear end of the lower member 20 is coupled to a not-illustrated front pillar.

The vehicle body front structure 10 according to the embodiment is basically configured as described above. Next, the operation effects thereof are described.

In the embodiment, the upper bracket 52a, that constitutes the torque rod attachment mechanism 46, is bonded to the rear attachment sections 44b of the damper housing 14. In addition, the lower bracket 52b and supporting bracket 52c, that constitute the torque rod attachment mechanism 46, are bonded to the front attachment sections 44a of the damper housing 14. The damper housing 14 is provided with the pair of lateral beads 28a, 28b, that extend in the vehicle longitudinal direction between the front and rear attachment sections 44a and 44b. This increases the rigidity and strength of the damper housing 14 under load transmitted rearward in the vehicle longitudinal direction from the front attachment sections 44a toward the rear of the vehicle and load transmitted forward in the vehicle longitudinal direction from the rear attachment sections 44b. In this embodiment, the damper housing 14 provides desired rigidity and strength even when the damper housing 14 is subjected to excessive load in the vehicle longitudinal direction.

In this embodiment, the damper housing 14 includes the first vertical wall section 24, in which a not-illustrated damper is placed, and a second vertical wall 26, in which the wheel W is placed. The portion between the first and second vertical wall sections 24 and 26 is subject to deformation. In this embodiment, the pair of lateral beads 28a, 28b is therefore provided between the first and second vertical wall sections 24 and 26. This reduces deformation of the damper housing 14 due to excessive load in the vehicle longitudinal direction.

Moreover, in the embodiment, the reinforcement panel 62 (damper housing reinforcement member, which reinforces the damper housing 14, is provided. The reinforcement panel 62 includes the first connecting section 68, which connects the damper housing 14 and the upper bracket 52a, the second connecting section 70, which connects the damper housing 14 and a damper base 12. The first and second connecting sections 68 and 70 are connected by the reinforcement panel 62. In this embodiment, load transmitted from the torque rod 48 through the torque rod attachment mechanism 46 is received by the first and second connecting sections 68 and 70 of the reinforcement panel 62 having comparatively high rigidity and strength. In this embodiment, therefore, the reinforcement panel 62 improves the rigidity and strength of the damper housing 14 under load in the vehicle longitudinal direction.

In this embodiment, the reinforcement panel 62 is provided on the outer surface (back surface) of the damper housing 14. However, the reinforcement panel 62 is not limited to this configuration. The reinforcement panel 62 may be provided on the inner surface (front surface) of the damper housing 14, that faces the power plant compartment P, similarly to the upper bracket 52a, lower bracket 52b, and supporting bracket 52c, which constitute the torque rod attachment mechanism 46, for example.

Furthermore, in this embodiment, the damper housing 14 is provided with the vertical reinforcement member 64, which is located rearward of the pair of lateral beads 28a, 28b and extends in the vertical direction. The reinforcement panel 62 includes the third connecting section 72, which connects the damper housing 14 and vertical reinforcement member 64. In this embodiment, therefore, by providing the third connecting section 72, which is connected to the vertical reinforcement member 64, for the reinforcement panel 62, the rigidity and strength of the damper housing 14 are improved under load in the vehicle longitudinal direction.

What is claimed is:

1. A vehicle body front structure including a bracket mechanism to attach a mounting member supporting a driving source of a vehicle to a damper housing, the structure comprising:

a front attachment section that attaches the bracket mechanism to the vehicle front side of the damper housing;

a rear attachment section that is located rearward of the front attachment section and attaches the bracket mechanism to the damper housing, wherein the damper housing includes a bead between the front attachment section and the rear attachment section, the bead extending in a vehicle longitudinal direction, the damper housing includes: a first vertical wall section that extends in a vertical direction to cover a damper; and a second vertical wall section that extends in the vertical direction to cover a wheel, and the bead is located between the first vertical wall section and the second vertical wall section.

2. A vehicle body front structure including a bracket mechanism to attach a mounting member supporting a driving source of a vehicle to a damper housing, the structure comprising:

a front attachment section that attaches the bracket mechanism to the vehicle front side of the damper housing;

a rear attachment section that is located rearward of the front attachment section and attaches the bracket mechanism to the damper housing, wherein the damper housing includes a bead between the front attachment section and the rear attachment section, the bead extending in a vehicle longitudinal direction, the damper housing includes: a damper base that closes an opening in upper part of the damper housing; and a damper housing reinforcement member that reinforces the damper housing, and the damper housing reinforcement member includes: a first connecting section that is connected to the damper housing and the bracket mechanism; and a second connecting section that is connected to the damper housing and the damper base.

3. The vehicle body front structure including a bracket mechanism to attach a mounting member supporting a driving source of a vehicle to a damper housing, the structure comprising:

a front attachment section that attaches the bracket mechanism to the vehicle front side of the damper housing;

a rear attachment section that is located rearward of the front attachment section and attaches the bracket mechanism to the damper housing, wherein the damper housing includes a bead between the front attachment section and the rear attachment section, the bead extending in a vehicle longitudinal direction, the damper housing includes a vertical reinforcement member that is located rearward of the bead in the vehicle longitudinal direction and extends in the vertical direction, and the structure further comprising:

a damper housing reinforcement member that reinforces the damper housing, the damper housing reinforcement member including connecting section that is connected to the damper housing and the vertical reinforcement member.

* * * * *